US011362802B2

(12) United States Patent
Rietman et al.

(10) Patent No.: US 11,362,802 B2
(45) Date of Patent: *Jun. 14, 2022

(54) CRYPTOGRAPHIC DEVICE ARRANGED TO COMPUTE A TARGET BLOCK CIPHER

(71) Applicant: KONINKLIJKE PHILIPS N.V., Eindhoven (NL)

(72) Inventors: Ronald Rietman, Eindhoven (NL); Sebastiaan Jacobus Antonius De Hoogh, Oosterhout (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/082,414

(22) Filed: Oct. 28, 2020

(65) Prior Publication Data
US 2021/0050313 A1 Feb. 18, 2021

Related U.S. Application Data

(63) Continuation of application No. 15/774,859, filed as application No. PCT/EP2016/075145 on Oct. 20, 2016, now Pat. No. 10,841,077.

(30) Foreign Application Priority Data
Nov. 9, 2015 (NL) ........................................ 2015745

(51) Int. Cl.
*H04L 9/00* (2022.01)
*H01L 21/48* (2006.01)
(Continued)

(52) U.S. Cl.
CPC ............... *H04L 9/004* (2013.01); *G09C 1/00* (2013.01); *H01L 21/4857* (2013.01);
(Continued)

(58) Field of Classification Search
CPC ... H04L 9/004; H04L 9/0618; H04L 2209/16; G09C 1/00; H01L 21/4857; H01L 23/48;
(Continued)

(56) References Cited

U.S. PATENT DOCUMENTS 8,386,791 B2 2/2013 Bevan et al.
9,473,941 B1 10/2016 Palin
(Continued)

FOREIGN PATENT DOCUMENTS

WO 2014072855 A1 5/2014
WO 2014096117 A1 6/2014
WO 2014154270 A1 10/2014

OTHER PUBLICATIONS

Chow et al: "A White-Box DES Implementation for DRM Applications"; DRM 2002, LNCS 2696, pp. 1-15, 2003.
(Continued)

*Primary Examiner* — Josnel Jeudy

(57) ABSTRACT

A cryptographic device (100) arranged to compute a target block cipher ($B_t$) on an input message (110), the device comprising a first and second block cipher unit (121, 122) arranged to compute the target block cipher ($B_t$) on the input message, and a first control unit (130) arranged to take the first block cipher result and the second block cipher result as input, and to produces the first block cipher result only if the block cipher results are equal.

50 Claims, 8 Drawing Sheets

(51) Int. Cl.
| | |
|---|---|
| *H01L 23/48* | (2006.01) |
| *H01L 23/498* | (2006.01) |
| *H01L 23/538* | (2006.01) |
| *H01L 23/66* | (2006.01) |
| *H01L 23/00* | (2006.01) |
| *H01P 3/06* | (2006.01) |
| *H01P 11/00* | (2006.01) |
| *H05K 1/02* | (2006.01) |
| *G09C 1/00* | (2006.01) |
| *H04L 9/06* | (2006.01) |

(52) U.S. Cl.
CPC ........ *H01L 23/48* (2013.01); *H01L 23/49838* (2013.01); *H01L 23/5383* (2013.01); *H01L 23/5386* (2013.01); *H01L 23/66* (2013.01); *H01L 24/16* (2013.01); *H01P 3/06* (2013.01); *H01P 11/005* (2013.01); *H04L 9/0618* (2013.01); *H05K 1/0218* (2013.01); *H05K 1/0219* (2013.01); *H01L 2223/6622* (2013.01); *H01L 2224/16227* (2013.01); *H01L 2224/16235* (2013.01); *H01L 2924/15192* (2013.01); *H01L 2924/15311* (2013.01); *H04L 2209/16* (2013.01); *H05K 1/0243* (2013.01)

(58) Field of Classification Search
CPC ........... H01L 23/49838; H01L 23/5383; H01L 23/5386; H01L 23/66; H01L 24/16; H01L 2223/6622; H01L 2224/16227; H01L 2224/16235; H01L 2924/15192; H01L 2924/15311; H01P 3/06; H01P 11/005; H05K 1/0218; H05K 1/0219; H05K 1/0243

USPC .......................................................... 713/189
See application file for complete search history.

(56) References Cited

U.S. PATENT DOCUMENTS

| | | | |
|---|---|---|---|
| 10,142,099 B2* | 11/2018 | Rose | H04L 9/0816 |
| 10,320,555 B2* | 6/2019 | Thiebeauld De La Crouee | H04L 9/3252 |
| 10,790,962 B2* | 9/2020 | Rietman | H04L 9/0618 |
| 2005/0021990 A1 | 1/2005 | Liardet et al. | |
| 2006/0140401 A1 | 6/2006 | Johnson et al. | |
| 2018/0198603 A1 | 7/2018 | Cammarota | |
| 2019/0229886 A1* | 7/2019 | Gouget | H04L 9/0618 |
| 2021/0266175 A1* | 8/2021 | Bernsen | H04L 9/0861 |

OTHER PUBLICATIONS

Jacob et al: "Attacking an Obfuscated Cipher By Injjecting Faults": DRM 2002, LNCS 2696, pp. 16-31, 2003.
Biham et al: "Differential Fault Analysis of Secret Key Cryptosystems"; Advances in Cryptology—Crypto '97, LNCS 1294, pp. 513-525, 1997.
Chow et al: "White-Box Cryptography and an EAS Implementation": SAC 2002, LNCS 2595, pp. 250-270, 2003.
Carlet et al: "Higher-Order Masking Schemes for S-Boxes": FSE 2012, LNCS 7549, pp. 366-384, 2012.
Wyseur et al "Cryptanalysis of White-Box DES Implemnetations With Arbitrary External Encodings" Slected Areas of Cryptography vol. 4876 2007.

* cited by examiner

| Index | Unit 121 | Unit 122 |
|---|---|---|
| 1 | a | f |
| 2 | b | f' |
| 3 | b' | 1 |
| 4 | a' | 2 |
| 5 | 1 | 3 |
| 6 | 2 | 4 |
| 7 | 3 | 5 |
| 8 | 4 | 6 |
| 9 | 5 | 7 |
| 10 | 6 | 8 |
| 11 | 7 | g |
| 12 | 8 | g' |
| 13 | 9 | 9 |
| 14 | c | 10 |
| 15 | c' | 11 |
| 16 | 10 | 12 |
| 17 | 11 | h |
| 18 | 12 | h' |
| 19 | 13 | 13 |
| 20 | 14 | i |
| 21 | 15 | i' |
| 22 | 16 | 14 |
| 23 | d | 15 |
| 24 | e | 16 |
| 25 | e' | j |
| 26 | d' | j' |

*Fig. 5a*

| Index | Unit 121 | Unit 122 |
|---|---|---|
| 1 | a | f |
| 2 | b | f' |
| 3 | b' | 1 |
| 4 | a' | 2 |
| 5 | 1 | 3 |
| 6 | 2 | 4 |
| 7 | 3 | 5 |
| 8 | 4 | 6 |
| 9 | 5 | 7 |
| 10 | 6 | 8 |
| 11 | 7 | g |
| 12 | 8 | g' |
| 13 | 9 | 9 |
| 14 | c | 10 |
| 15 | c' | 11 |
| 16 | 10 | 12 |
| 17 | 11 | h |
| 18 | 12 | h' |
| 19 | 13 | 13 |
| 20 | 14 | i |
| 21 | 15 | i' |
| 22 | 16 | 14 |
| 23 | d | 15 |
| 24 | d' | 16 |
| 25 | g | g |
| 26 | g | g |

*Fig. 5b*

CRYPTOGRAPHIC DEVICE ARRANGED TO COMPUTE A TARGET BLOCK CIPHER

CROSS-REFERENCE TO PRIOR APPLICATIONS

This application is a Continuation of application Ser. No. 15/774,859, filed on May 9, 2018, which is the U.S. National Phase application under 35 U.S.C. § 371 of International Application No. PCT/EP2016/075145, filed on Oct. 20, 2016, which claims the benefit of Dutch Patent Application No. N2015745, filed on Nov. 9, 2015. These applications are hereby incorporated by reference herein.

FIELD OF THE INVENTION

The invention relates to a cryptographic device, a cryptographic method, a computer program and a computer readable medium.

BACKGROUND

In the paper "A White-Box DES Implementation for DRM Applications" by S. Chow, et al. a white-box implementation of the Data Encryption Standard (DES) is presented (referred to as 'Chow' below). A white-box implementation is a cryptographic implementation designed to withstand an attack in the white-box context. In the white-box context, the attacker has total visibility into software implementation and execution. Nevertheless, even so the white-box implementation aims to prevent the extraction of secret keys from the program.

Chow forms an implementation of DES that consists entirely of table look-up operations. Through several intermediate methods the normal cipher is transformed to an implementation in this form, so that a table-network can be used to compute DES. By encoding the tables in the table-network the system's resistance against analysis and attack is increased.

Although a white-box implementation using a table-network is hard to analyze, a table based implementation of block cipher may still be vulnerable to some attacks. The inventors realized that even if a key may not be directly derived from observing the variables in a white-box implementation, access to the variables may be used to execute an attack previously only known from the realm of physical attacks.

For example, in the paper "Differential Fault Analysis of Secret Key Cryptosystems" by Biham, et al. transient faults are introduced in a smart card by changing the power supply voltage causing a DES computation to produce an incorrect result. By analyzing the errors that result from the transient fault, information on the secret key is obtained.

The inventor had the insight that such physical fault attacks may be adapted to attack a white-box implementation. Even if it were not possible to obtain secret information from analysis of variables visible to the attacker, the attacker may be able to derive secret information by modifying encoded variables to try to emulate the physical attack. The intentional modification of variables acts as the transient fault.

Countermeasures introduced in the prior art against differential fault attacks proved ineffective in the white-box model; for example, in U.S. Pat. No. 8,386,791B2, 'Secure data processing method based particularly on a cryptographic algorithm'. The block cipher DES is applied to input data twice. The results of the two computations are then compared. If they are unequal a fault has been detected.

In the white-box model this countermeasure is easily circumvented. For example, one may disable the second execution, or the comparison, or one may introduce the same fault in both copies of DES. There is a need for new DFA countermeasures which can be better protected when attacked in the white box model.

SUMMARY OF THE INVENTION

A cryptographic device is provided arranged to compute a target block cipher on an input message. The device comprises a first block cipher unit arranged to
compute the target block cipher on the input message obtaining a first block cipher result,
a second block cipher unit arranged to
compute the target block cipher on the input message obtaining a second block cipher result,
a first control unit arranged to take the first block cipher result and the second block cipher result as input. In general, a control unit takes as input a first value and a second value and produces the first value only if the first value and the second value are equal, the control unit being arranged to
combine the first value and the second value by applying a first combination function to the first value and the second value obtaining a comparison value, said combination function being equal to a predetermined value only if the first value and second value are equal, and
compute an ancillary block cipher on the comparison value, obtaining a computed control value, and
combine the first value, the computed control value, and a stored control value by applying a second combination function, said second combination function producing the first value only if the computed control value equals the stored control value.

This construction reduces the information that can be derived from the observed final output after introducing faults anywhere in the program. In the cryptographic device a fault in the block cipher result is not directly propagated. Thus an attacker cannot derive information therefrom, thus complicating DFA attacks.

In an embodiment, the outputs of the control unit may be masked by a further block cipher in the control unit before the second comparison function. In an embodiment, the cryptographic device comprises the inverse of the masking block cipher after the second comparison function. The inverse of the masking block cipher causes that any change induced by the second comparison function is distributed over the entire block cipher result.

In an embodiment, the cryptographic device comprises more than two block cipher units for the target block cipher and multiple control units, to further complicate DFA for an attacker.

The cryptographic device is an electronic device, for example, a mobile electronic device. The cryptographic device may be a mobile phone, set-top box, computer, etc.

The cryptographic method and device method herein may be applied in a wide range of practical applications. Such practical applications include: banking application, secure communication, digital rights management etc.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises nontransitory program code stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIGS. 1a, 1b, 2, 3, 4a, and 4b schematically show examples of an embodiment of a cryptographic device, FIG. 5a schematically shows examples of a sequence of rounds, FIG. 5b schematically shows examples of a sequence of rounds, FIG. 6 schematically shows examples of flow charts of cryptographic methods, FIG. 7a schematically shows a computer readable medium having a writable part comprising a computer program according to an embodiment, FIG. 7b schematically shows a representation of a processor system according to an embodiment.

DETAILED DESCRIPTION OF PREFERRED EMBODIMENTS

Figure 1A:
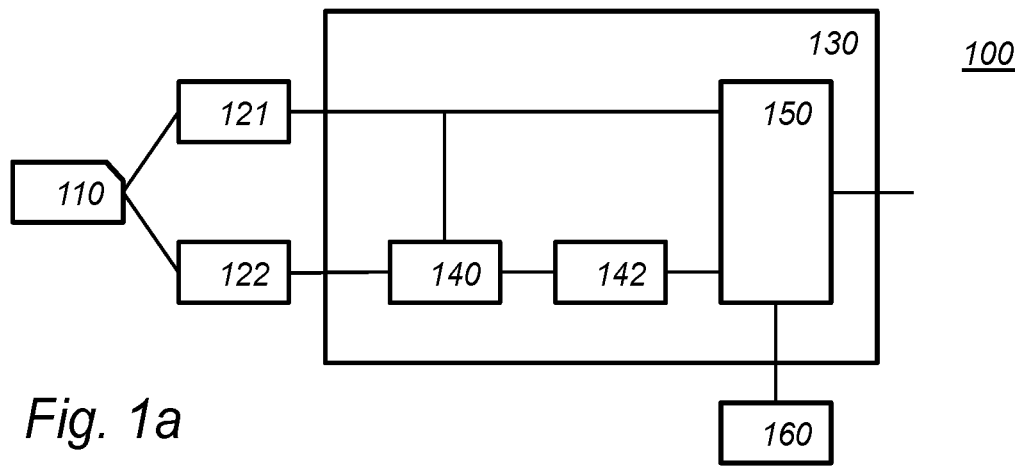

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described above or recited in mutually different dependent claims.

FIG. 1a schematically shows an example of an embodiment of a cryptographic device 100.

Cryptographic device 100 is configured to calculate a target block cipher on an input message 110. The block cipher has multiple rounds that successively operate on the input to produce an output. Most block ciphers are vulnerable to differential fault attacks. For example, block ciphers for which the final round is based on a round function, as is used, e.g., in Feistel type ciphers are vulnerable to a particular type of differential fault attack. By operating the cipher twice on the same input, but manipulating a value in the final round—a so-called fault—an attacker can obtain information on the secret cryptographic key by comparing the output with and without the fault. Traditionally, differential fault attacks are performed by manipulating the hardware on which the cipher is executed to physically cause the fault; for example, voltage spikes may be introduced to cause the hardware to introduce a fault in the computation. The inventor has realized that differential fault attacks can also be executed in the white box attack models. In a white-box attack model, an attacker is assumed to have the power to manipulate a variable of the block cipher while the cipher is being executed. For many applications, the white box attack model more closely resembles the realities of protecting computer data and software.

Cryptographic device 100 is arranged to compute a target block cipher $B_t$ on an input message 110. For example, cryptographic device 100 may comprise a receiver for receiving message 110, or device 100 may comprise a storage for messages in which message 110 is stored (neither separately shown in FIG. 1a). Cryptographic device 100 may be arranged for computing the target block cipher in encryption mode or decryption mode.

Cryptographic device 100 comprises a first block cipher unit 121 and a second block cipher unit 122. The first and second block ciphers units 121, 122 are arranged to compute the target block cipher $B_t$ on input message 110 to obtain a first and second block cipher result $C_1$ and $C_2$, respectively.

The target block cipher is a block cipher which is to be protected against fault attacks. For example, the target block cipher may be DES, triple-DES, AES, and the like. In an embodiment, the first and second block cipher units 121 and 122 are implement the target block cipher in a table network using white-box cryptography, e.g., as shown in Chow. Table-network implementations are also known for AES, etc.

An attacker may be able to take full control over the software that runs on a computing device, e.g., a smartphone or a PC, and the like. It is the goal of white-box cryptography to protect the software implementation against such an attacker.

A block cipher transforms a plaintext P of a certain number of bits, e.g., 64 bits for DES, into a cipher text C of the same size. This transformation is controlled by a key, e.g., of 56 bits for DES, 168 bits for triple DES. It is one of the goals of white-box cryptography to make it hard for an attacker to retrieve the key from the implementation. Many attacks on a software implementation can be thwarted by encoding the internal variables and operating upon the encoded variables by tables, e.g., in the form of a table network. As the tables are adapted to the encoding of the variables this may still give the same results.

A particularly powerful attack on the key in a white-box environment is based on differential fault analysis. The attacker modifies a suitable internal variable of the cipher and observes the changes in the resulting cipher text. Knowing the details of the cipher algorithm, allows him to quickly extract the key. Fault attacks are particularly worrisome for white-box implementations as they bypass the encoding of the internal variables. Deductions about the key are made from the type of faults that occur in the output of the white box implementation.

Cryptographic device 100 further comprises a first control unit 130. Control units will be illustrated by first control unit 130 and masking control unit 131, discussed with reference to FIGS. 1a and 1b.

A control unit, such as control unit 130 takes as input a first value and a second value and produces the first value only if the first value and the second value are equal. In this case, the first control unit 130 is arranged to take first block cipher result $C_1$ and second block cipher result $C_2$ as input.

A control unit is arranged to combine the first value and the second value by applying a first combination function to the first value and the second value obtaining a comparison value, said combination function being equal to a predetermined value only if the first value and second value are equal. For example, the first comparison function may be implemented as a first comparison table or table-network. As shown in FIG. 1a, the first comparison function may be implemented as a first comparison function unit 140. First comparison function unit 140 receives as input the first and second value, and produces the predetermined comparison value as output.

There are many ways to implement a comparison function. Below $C_1$ and $C_2$ are used to represent the first and second input values.

For example, the first comparison function 140 may be the exclusive-or (XOR) of the first value and the second value: $C_1 \oplus C_2$.

The comparison may be a difference, say $C_1 - C_2$. Said difference may be represented in two's complement, or computed modulo a modulus, etc. For example, at least part of the first combination function is formed by the arithmetic difference between at least part of the first value and at least part of the second value. For example, let $C_1 = (c_{1,1}, c_{1,2}, \ldots, c_{1,n})$ and $C_2 = (c_{2,1}, c_{2,2}, \ldots, c_{2,n})$, in which the small c's represent parts of the first and second value respectively. For example, the parts may be bytes or nibbles, etc. The first comparison function may be $(c_{1,1} - c_{2,1}, c_{1,2} - c_{2,2}, \ldots, c_{1,n} - c_{2,n})$, the part-wise difference between the first and second value. The difference may be modulo a modulus, say modulo 2 to the power of the bit size of the parts. The difference may be an absolute difference etc.

The comparison function 140 may be a function comb $(C_1, C_2)$. The first comparison function 140 may be composed of multiple sub-functions $f_i$. For example, the first comparison function may be $(f_1(c_{1,1}, c_{2,1}), f_2(c_{1,2}, c_{2,2}), \ldots, f_n(c_{1,n}, c_{2,n}))$. The multiple sub-functions have the property that they equal a predetermined value only if the first part and second part are equal. The sub-functions may be implemented as a look-up table.

Preferably the function $f_i$ have the property that $f_i(x, x)$ is a constant function and that $f(x, y)$ and $f(y, x)$ are bijections for any fixed y and variable x.

Below an example is given of a sub-function operating on 2 bit values, given in the first row and column. Note that the sub-function is bijective in either coordinate.

|    | 00 | 01 | 10 | 11 |
|----|----|----|----|----|
| 00 | 00 | 11 | 10 | 01 |
| 01 | 10 | 00 | 01 | 11 |
| 10 | 10 | 11 | 00 | 10 |
| 11 | 01 | 10 | 11 | 00 |

Such tables may be easily constructed by first filling the main diagonal with the predetermined value, and filling the remainder with random values, backtracking if a bijectivity condition is broken.

The predetermined value may be zero (0). The predetermined value may be any other value, say $\delta$. Given a first comparison function that has 0 has predetermined value, a first comparison function may be constructed for any other fixed value, say $f + \delta$, or $f \oplus \delta$, etc., and vice versa. Below we will assume that the predetermined value is 0, though the skilled reader is reminded it could be any desired value.

The control unit further comprises an ancillary block cipher 142. The ancillary block cipher 142 may be any block cipher $B_1$, say DES, AES etc. It is an advantage if the ancillary block cipher 142 has the same structure as the target block cipher. In general, a block cipher of the same structure may be obtained by modifying parameters of the target block cipher, e.g., modifying S-boxes, modifying linear operators or permutations, etc. An ancillary block cipher of similar structure may also be obtained by modifying its key. For example, by replacing the key with a different key. The ancillary block cipher and the target block cipher could be identical and use the same key but with a different encoding. For example, if the encoding used in the ancillary block cipher for the key encoding is different, e.g., randomly chosen, then in effect the key used in the ancillary block cipher is unrelated to the key used in the target block cipher.

Ancillary block cipher 142 is computed on the comparison value, obtaining a computed control value $\Delta_{comp}$. If no faults occurred in the first or second block cipher units the ancillary block cipher 142 is computed on the predetermined value, e.g., $B_1(0)$. Thus if no faults have occurred, the computed control value $\Delta_{comp}$, is known. The known value of the computed control value in case no fault occurred is stored, e.g., with the cryptographic device, e.g., in a storage 160. The stored control value may be encoded.

The ancillary block cipher may be implemented by a block cipher unit.

The control unit comprises a second combination function 150, e.g., an implemented in a second combination function unit. Second combination function 150 combines the first value computed by the first block cipher unit 121, the computed control value $\Delta_{comp}$ computed by the first comparison function 140 and a stored control value $\Delta_{store}$. Second combination function 150 produces the first value only if the computed control value $\Delta_{comp}$ equals the stored control value $\Delta_{store}$.

For example, a second combination function may be constructed from a first comparison function. For example, if g denotes a second combination function and $f$ a first combination function with predetermined value 0 then one may take, e.g., $g(x, \Delta_{comp}, \Delta_{store}) = x + f(\Delta_{comp}, \Delta_{store})$, or $g(x, \Delta_{comp}, \Delta_{store}) = x \oplus f(\Delta_{comp}, \Delta_{store})$, etc. Herein, x denotes the first value possibly in masked form.

As discussed, above for first comparison functions, examples for second comparison functions include the following.

For example, the second combination function may be the exclusive-or (XOR) of the first value or masked first value, the computed control value ($\Delta_{comp}$), and a stored control value ($\Delta_{store}$). The order of the XOR may be varied for example, $(x \oplus \Delta_{comp}) \oplus \Delta_{store}$, or $(x \oplus \Delta_{store}) \oplus \Delta_{comp}$, or $x \oplus (\Delta_{comp} \oplus \Delta_{store})$, etc.

For example, at least part of the second combination function may be formed by the sum of at least part of the first value or masked first value, at least part of the computed control value ($\Delta_{comp}$), minus at least part of the stored control value ($\Delta_{store}$), For example, at least part of the second combination function may be formed by the sum of at least part of the first value or masked first value, at least part of the stored control value ($\Delta_{store}$) minus at least part of the computed control value ($\Delta_{comp}$), For example, at least part of the second combination function may be formed by applying a look-up table to at least part of the first value or masked first value, at least part of the computed control value ($\Delta_{comp}$), and at least part of the stored control value ($\Delta_{store}$), the look-up table giving the at least part of the first value or masked first value if the at least part of the computed control value ($\Delta_{comp}$) and at least part of the stored control value ($\Delta_{store}$) are equal.

The second comparison function is one of the factors that causes that the output of the control function is less sensitive to DFA. In a system that is susceptible to a DFA attack, the faulty value that is returned when a certain fault is injected allows the attacker to extract information about the key, e.g., because there is a relationship between the faulty result and the sensitive information, e.g., the key. In the cryptographic device, an attacker cannot successfully execute the analysis phase of the DFA attack since the values he receives are not the true faulty answers. By giving false faulty output, the attacker is not allowed to obtain this information about the key. True faulty output is given only when multiple, related faults are injected in precisely the right places. Figuring out where to inject the faults and how to relate the injected faults such that the faulty output can be used to obtain information about the key is difficult.

For example and in particular, if only a single fault occurred, a value is still propagated, but not the true faulty value. Details of the fault are also masked by the ancillary block cipher.

Also a second comparison function g (x, y, z) may be constructed as a table, by setting first g(x, y, y)=x for all x and y in range, and filling the remainder of the table with random values. In an embodiment, also the second comparison function is bijective in any coordinate. That is by keeping two of the tree parameters fixed, the function g (x, y, z) is a bijection when the remaining variable is allowed to vary. Herein x is the first value, y the computed comparison value and z the stored comparison value. This condition can be imposed on the constructed table, e.g., by backtracking if a bijection condition is violated.

Having the second comparison function satisfying the bijectivity conditions, avoids structure that an attacker may employ. Especially, the condition that g(x, y, z) is a bijection if x and z are arbitrary but fixed values, in combination with the two bijectivity conditions on the first comparison function causes faulty answers to be effectively randomized. Any error is reflected in the first comparison value. Said error is consequently randomized through the ancillary block cipher even without a masking block cipher. The randomized computed control value in turn causes the first value to be randomized. The examples given based on, e.g., XOR, or differences satisfy this condition.

In case of the first control function 130, the first block cipher result $C_1$ is produced if no faults occurred. In case a fault occurred in either block cipher unit 121 or 122, or in case a different fault occurred in both, the comparison value will not be equal to the predetermined comparison value. In this case, the computed control value will not equal the stored control value. Finally, the second combination function will not produce the first block cipher result. The attacker thus cannot use the first block cipher result in a DFA attack.

The stored control value may be stored in a storage unit 160. For example, the storage unit 160 may be a memory or other electronic storage. For example, storage unit 160 may store the value $B_1(0)$.

Figure 1B:
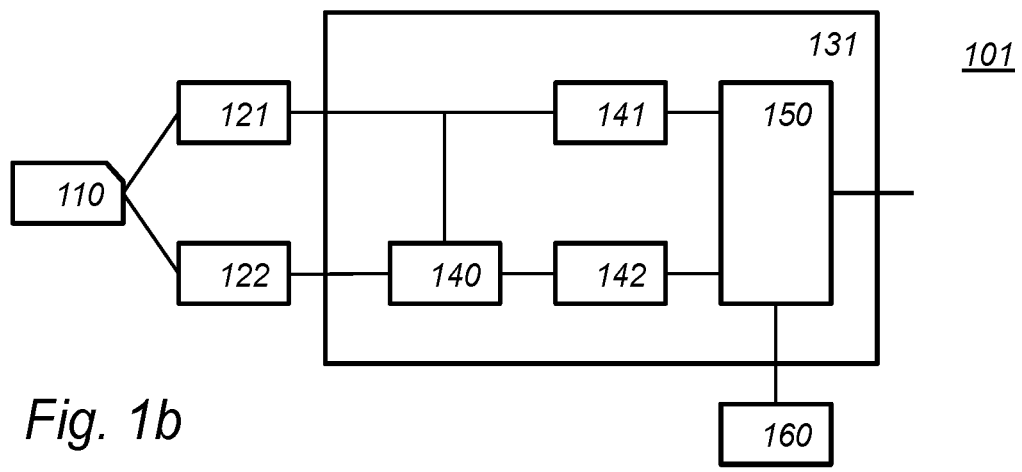

FIG. 1b schematically shows an example of an embodiment of a cryptographic device 101. Cryptographic device 101 differs from cryptographic device 100 in that a masking control unit 131 is used, instead of control unit 130. Masking control unit 131 is the same as control unit 130 except that a masking block cipher 141 is added. In general, a masking control unit computes a masking block cipher on the first value thus obtaining the first value in masked form.

Masking block cipher 141 computes a masking block cipher $B_m$ on the first value thus obtaining the first value in masked form, e.g., $B_m(C_1)$. In case of FIG. 1b, the first value is the first block cipher result $C_1$. Masking block cipher 141 makes no differences for first comparison function 140. Second combination function 150 now combines the first value in masked form, e.g., $B_m(C_1)$, computed by the masking block cipher 141, the computed control value $\Delta_{comp}$ computed by the first comparison function 140 and a stored control value $\Delta_{store}$. Note that the stored control value $\Delta_{store}$ is the same in FIG. 1a as in FIG. 1b, since it depends on the ancillary block cipher but not on the masking block cipher.

The result is that, in FIG. 1b, if no faults occurred control unit 131 produces the masked first block cipher result $B_m(C_1)$. As will be discussed below, if a masking control function is used on different inputs, e.g., not on block cipher results but say on the outputs of other control units, and if a suitable choice is made for the masking block cipher, the masking control unit can also remove a mask from an input rather than add a mask.

Masking block cipher 141 also causes the result of control unit 131 to be effectively randomized in case of a fault. In case of a fault, an attacker will not receive the masked first block cipher result. Interestingly, even if second combination function 150 were to produce results that are close, say within a few bits of masked first block cipher result, then still the output would still carry little information as it has been encrypted by the masking block cipher. For example, even if the attacker had access to a decryption unit for masking block cipher unit 141—which he generally would not have—then decrypting the similar value would be completely different from the faulty first block cipher result. The latter happens because a small bit change at the input of a block cipher leads to a large difference at its output.

Figure 2:
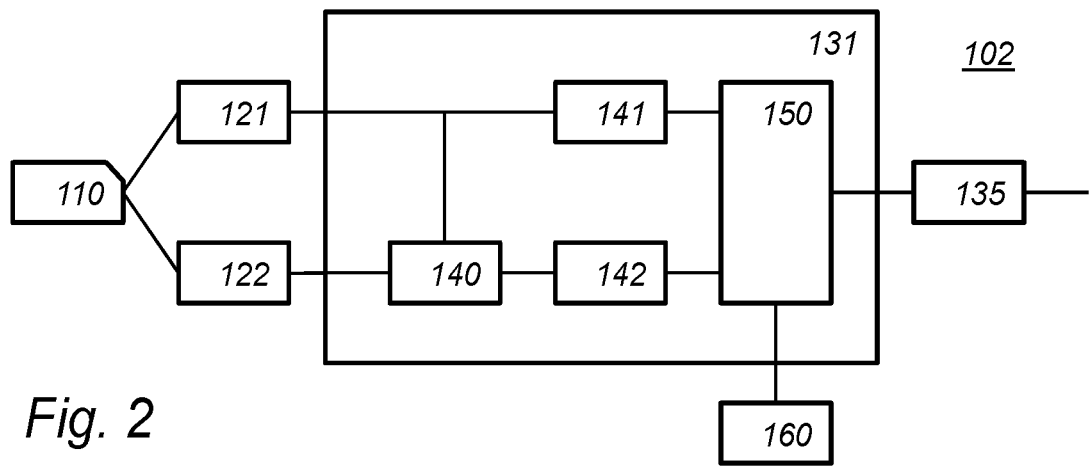
Figure 3:
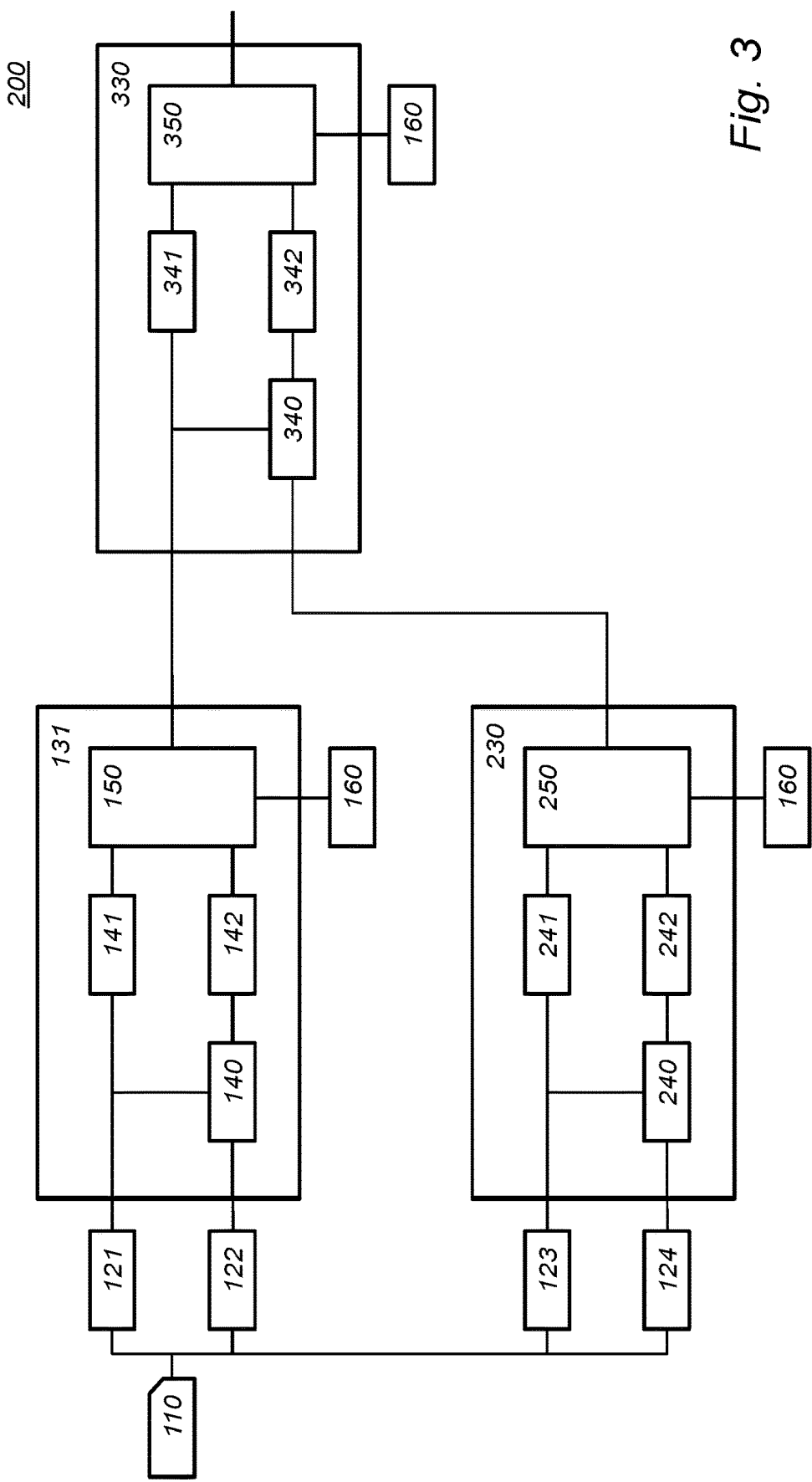

The output of control unit 131 may be used as is, e.g., to store a message in encrypted form. In this case, when said message is decrypted the masking block cipher would first by inverted followed by a decryption of the target block cipher. FIGS. 2, 3, and 4, show further ways in which a masking control unit may be used. For example, FIG. 2 shows a cryptographic device 102, which is the same as a cryptographic device 101 except that masking control unit 131 is followed by a further block cipher unit 135 arranged to compute the inverse of the masking block cipher $B_m^{-1}$ on the result of the first masking control unit.

In cryptographic device 102, the result of the target block cipher is produced, e.g., an encryption or decryption function, without a masking. The operation of encryption and decryption with masking block cipher causes the effect of the second comparison function to be distributed over the entire block cipher result.

In an embodiment, the masking block cipher 141 and the ancillary block cipher 142 have the same structure. The masking block cipher $B_m$ and the ancillary block cipher $B_1$ may also be the same block cipher.

In an embodiment, the masking block cipher 141, the ancillary block cipher 142 and the target block cipher all have the same structure. This will make it very hard for the attacker to distinguish the target block cipher from the masking and ancillary block cipher, especially if the computations are performed by a table network on encoded variables, e.g., in a white-box implementation.

In an embodiment, the target block cipher $B_t$ comprises multiple block cipher rounds. The implementation of the target block cipher in block ciphers units 121 and 122 may include within the multiple block cipher rounds one or more dummy rounds. A dummy round performs a calculation but does not influence the final result of the block cipher calculation. The block cipher rounds and the dummy rounds and block cipher rounds together form a sequence of rounds which includes the multiple block cipher rounds and the one or more dummy rounds interspersed among the block cipher rounds.

For example, a dummy round may update variables that on which the final result does not depend. A more effective way to introduce dummy rounds is to match a dummy round with the inverse of the dummy round. A dummy round can be made by selecting an arbitrary round of the block cipher. For example, the sequence of rounds in the target block cipher ($B_t$) in the first or second block cipher unit may comprise a dummy round and the inverse of said dummy round, e.g., consecutively.

In an embodiment, the last block cipher round in the sequence of the first block cipher unit is not aligned with a last block cipher round in the sequence of the second block cipher unit. For example, the rounds in the sequence of rounds may have a round number, or index, indicating its place in the sequence; the round number of the last block cipher round in the sequence of rounds in first block cipher unit 121 and second block cipher unit 122 is different.

For example, this may be achieved using the following two sequences for the rounds in the in units 121 and 122. Here the sequence is assumed to have 16 block cipher rounds, e.g., as in DES. The table in FIG. 5 shows an example sequence of rounds for unit 121 and 122. In the example shown block cipher rounds are indicated by numbers, letters denote dummy rounds. Primes denote the inverse.

Note in FIG. 5*a* that the final round of the block cipher: round 16 is not aligned in the two sequences. For block cipher unit 121 the final block cipher round has index 22. For block cipher unit 122 the final block cipher round has index 24. These two indices are different. Note that also the index of next-to-last round, in this case round 15, also is not aligned: having index 21 and 23 respectively. The inventors found that also the next-to-last round is vulnerable to DFA, especially in case of DES and triple DES. The sequences of rounds include dummy rounds. Some of the dummy rounds are directly followed by their inverse. For example, dummy round c with index 14. The sequence also includes patterns such as a b b' a', e.g., a first dummy round, a second dummy round, followed by the inverse of the second dummy the round and the inverse of the first dummy round.

In the example of FIG. 5*a*, the final results of the first and second block ciphers are the same. In an embodiment, the results of the final rounds of the first and second block ciphers is jointly encoded and should preferably reveal no or little information to the attacker. A potential risk though is that the joint encoding of two identical values may correlate with the final outcome of the whole system. In an advanced attack, the attacker would run the system many times and identify all intermediate data that correlates with the final result. This may in turn reveal the location in the table network where the final (dummy) round of the first and second block ciphers are computed. It is generally undesirable, if an attacker has access to this information.

To improve the protection, the measure described with reference to FIG. 5*b* below may be used. In fact, in some cases, a weaker encoding may be preferred, e.g., due to competing resource requirements, in such cases the embodiment below may also be helpful. FIG. 5*b*, like FIG. 5*a* shows a sequence of block cipher rounds together with dummy rounds.

As in FIG. 5*a*, in the embodiment of FIG. 5*b* the final rounds of the first and second block cipher are arranged so that they are not-aligned. We will refer to the result of the final round of the first and second block cipher as C. Cipher text C is calculated in both branches, i.e., in the first and second block cipher but not aligned, not in the same round. Once C is calculated, a further non-trivial calculation is done in each branch, for example, a few additional rounds of DES or AES, with a random key, leading to cipher text G. The difference with FIG. 5*a*, is that the dummy rounds following the final rounds are not balanced. In the example of FIG. 5*b*, unit 121 is arranged to execute four further dummy rounds, and unit 122 to execute two additional dummy rounds. The dummy rounds are chosen so that unit 121 and 122 execute, in total, the same number of rounds. Furthermore, the dummy rounds are selected so that, on the same input, they produce the same output. In the example, of FIG. 5*b* a dummy round is either inverted in the same unit (e.g., dummy rounds d and d' in unit 121) or duplicated in the other unit (e.g., dummy rounds g). Note that the dummy rounds are not balanced. If round 26 in FIG. 5*b*, had used g' rather than g, the system would be balanced and both would produce cipher text C, as in FIG. 5*a*, but as it is both produce a different cipher text G. Note that round 26 may be omitted, or replaced with a different dummy round. More dummy rounds are possible as well. Different cipher text G may be regarded as an encrypted version of the correct cipher text C, in the case of FIG. 5*b* as g(g(C)).

Through the use of dummy rounds, the calculation of G or aligned. Thus if no faults occur, both units produce the same value G. Then in first control unit 130 that follows the difference (e.g. XOR, etc.) is taken from the two branches. If no faults occurred, the difference will be 0, as in FIG. 5*a*. The ancillary block cipher 142 acts on the comparison value, obtaining a computed control value $\Delta_{comp}$ as before. In masking block cipher 141 the unbalanced dummy rounds are inverted at the start of masking block cipher 141 as new dummy rounds. This in the example of FIG. 5*b*, masking block cipher 141 may start with two dummy rounds g'. The dummy rounds inserted at the start of masking block cipher 141 are chosen so that at the end of the inserted dummy rounds the cipher text C is obtained, e.g., by inverting the dummy rounds that occur after the final block cipher rounds that computed C, in either unit 121 or unit 122.

The additional dummy rounds avoid that the cipher text C occurs in a joint encoding. The joint encoding at the end of units 121 and 122 are much less correlated due to the additional dummy rounds (e.g. dummy round g). Although cipher text C still occurs in the computations, e.g., after rounds 22 and 24 in units 121 and 122, there it is not jointly encoded with itself, so the possibly correlation is much less there.

In the cryptographic devices of FIGS. 1*a*-1*c* and 2, the DFA countermeasure could be circumvented by executing the same fault in block cipher unit 121 and 122. Having unaligned rounds ensures that the two positions of introducing the faults are not located in the same positions. Finding a suitable place to introduce a fault in a white-box implementation is already a challenge, however when two such needs to be found the amount of work increases considerably. An attacker can only recognize that he executed a fault correctly, if he executed all faults correctly during the same run.

In an embodiment, the variables of the cryptographic devices are encoded. In particular, a first variable of a round in the sequence of the target block cipher $B_t$ in the first block cipher unit may be jointly encoded with a corresponding second variable in the same round in the sequence of the target block cipher $B_t$ in the second block cipher unit.

For example, a first variable $x_1$ of a round in the sequence of the target block cipher ($B_t$) in the first block cipher unit is jointly encoded with a corresponding second variable $x_2$ in the same round in the sequence of the target block cipher ($B_t$) in the second block cipher unit. The same may also be done for the masking block cipher and the ancillary block cipher. The variables may, e.g., be a nibble or a byte, etc.

Jointly encoding two variables makes executing a DFA attack on those variables harder. In an embodiment, multiple or even all variables in the first and second block cipher unit or in the masking and ancillary block cipher unit are jointly encoded.

For example, referring to FIG. 5a, a variable in round 26(d') of block cipher unit 121 may be jointly encoded with a variable in round 26(j') of block cipher unit 122. A corresponding variable occurs in the same relative location. In case of the target block cipher units a corresponding variable also operates on the same data. In case of the masking and ancillary block ciphers corresponding variable may operate on different data.

The joint encoding has the advantage that a change to a variable will usually induce a change to a corresponding variable in the other block cipher. For example, the variables may be encoded as $x=\text{Enc}(x_1, x_2)$. Herein Enc denotes an encoding. For example, an encoding may be a randomly selected bijective mapping, e.g., selected at compile time. In an embodiment, the first and second block cipher units act on the jointly encoded variables.

For example, an operation $T_1$ acting on $x_1$ and an operation $T_2$ acting on $x_2$ may be jointly performed by an operation T as follows $T(x)=\text{Enc }(T_1(\tau_1(x)), T_2(\tau_2(x)))$. In the latter equation $\tau_1$ and $\tau_2$ denote the decoding of x so that $x=\text{Enc}(\tau_1(x), \tau_2(x))$.

If a fault modifies x, then likely both $x_1$ and $x_2$ are affected, unless the fault happens to correspond to $\text{Enc}(x'_1, x_2)$, for some modified $x_1$, which is unlikely.

Also the first and second comparison functions may be performed on encoded data. For example, a first comparison function $f(x_1, x_2)$ may be lifted to the encoded domain as $\text{Enc}(\tau_1(x), f(\tau_1(x), \tau_2(x)))$. The latter may be implemented as a single table. The encoding of x may also include a so called state variable. A state variable introduces further redundant data into the encoding. For example, $x=\text{Enc }(x_1, x_2, s)$ in which s is the state variable. In particular, the variables $x_1$, $x_2$ may be distributed over multiple shares $x_1^j$ and $x_2^j$ so that $x_i=\Sigma x_i^j$, the sum may be an XOR operation, or arithmetic sum etc. The variables $x_1$, $x_2$ may now be encoded as multiple encoded shares ($x^j$), an encoded share being an encoding ($x^j=\text{Enc}_j(x_1^j x_2^j, s^j)$).

For example, the cryptographic device may comprise a data store arranged to store multiple variables in encoded form on which the cryptographic device acts at least to compute the target block ciphers. The cryptographic device may further comprise a table store storing multiple look-up tables, a look-up table taking as input one or more encoded shares of one or more variables, the multiple look-up tables together forming a table network implementing at least the target block ciphers. In an embodiment, the variables of the masking block cipher are jointly encoded with the variables of the ancillary block cipher. The multiple look-up tables also implementing the rest of the cryptographic device, e.g., the masking and ancillary block cipher and the first and second control function.

The data and table store may be combined with the storage unit 160. The data store may be volatile memory, the table store and storage unit may both be volatile or non-volatile memory.

Joint encoding is easier if the target block ciphers have the same structure, and similarly the masking and ancillary block cipher; For example, if each variable in a first block cipher has a corresponding variable in the second block cipher.

The target block cipher, ancillary block cipher, and masking block cipher may have a fixed key, say embedded therein by partial evaluation. They may also use a non-fixed key read from a storage, say a memory, or received etc. The key, like the variables, may be encoded.

Table networks are known from white-box cryptography per se. See for example, the paper of chow referred to above or "White-box cryptography and an AES implementation", also by Chow et al., incorporated by herein by reference. A table network receives one or more inputs and produces one or more outputs. In a table network multiple look-up tables may be used, e.g., stored in a table storage. Tables take inputs directly from the inputs and/or the outputs of other tables. A table may take a single input, two inputs, or more than two inputs.

A convenient way to convert a computation on un-encoded variables w to a computation on variables w encoded as multiple shares which may also be implemented as a table network is provided in "Higher-Order Masking Schemes for S-boxes", by Carlet et al., incorporated by herein by reference.

Figure 4A:
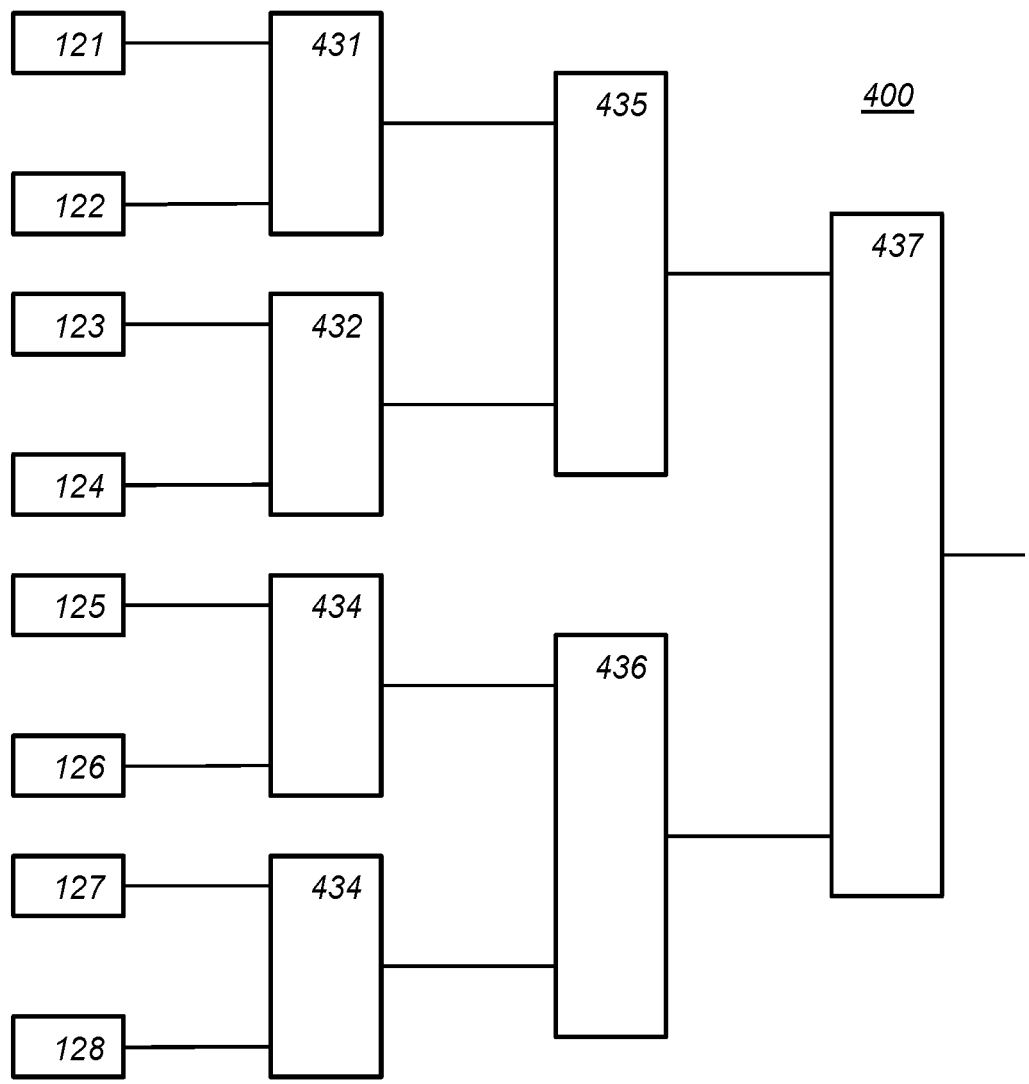
Figure 4B:
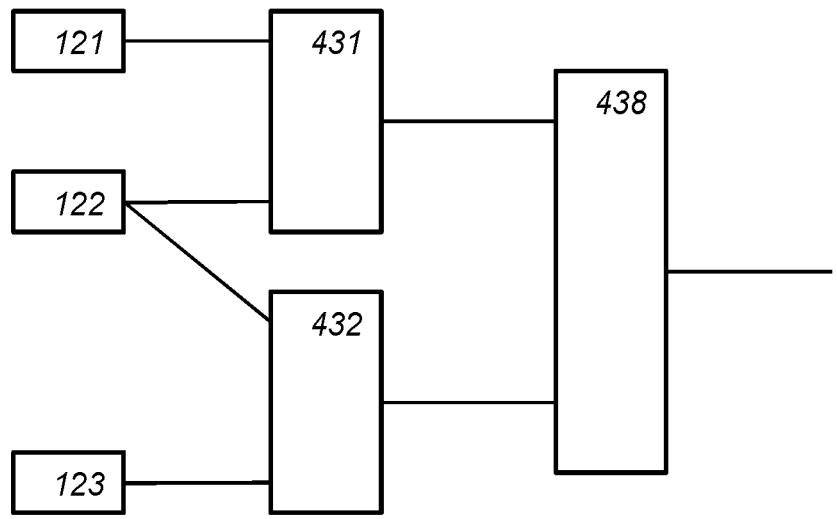

In an embodiment, a cryptographic device comprises
multiple block cipher units each arranged to compute the target block cipher ($B_t$) on the input message obtaining a block cipher result ($C_i$),
one or more first control units arranged to takes as input two block cipher result of the block cipher result ($C_i$) of the multiple block cipher units, and
one or more second control units for combining the results of the first control units to produce a final block cipher result, the final block cipher result being equal to the block cipher result of a first block cipher unit of the multiple block cipher units only if all block cipher results ($C_i$) of the multiple block cipher units are equal. In an embodiment, the number of first control units is more than 2. Embodiments of this type are illustrated in FIGS. 3, 4a and 4b.

FIG. 3 schematically shows an example of an embodiment of a cryptographic device 200.

Cryptographic device 200 comprises a first and second block cipher unit 121 and 122 and control unit 131 as shown in FIG. 1b. Cryptographic device 200 further comprises a
a third block cipher unit 123 arranged to compute the target block cipher $B_t$ on the input message obtaining a third value $C_3$, and
a fourth block cipher unit 124 arranged to compute the target block cipher $B_t$ on the input message obtaining a fourth value $C_4$,
If no faults occur each one of the multiple block cipher units produce the same block cipher result. Note that each of the block cipher units may use a different encoding. Thus that these values are the same can only be verified if one has access to the encoding used by the cryptographic device. Typically, an attacker will not be provided with access to the encodings used to create, e.g., compile, the cryptographic device 200.

Cryptographic device 200 comprises a second masking control unit 230 arranged to take the third block cipher result $C_3$ and the fourth block cipher result $C_4$ as input.

The masking control unit 230 comprises a second combination function 240, masking block cipher unit 241, ancillary block cipher unit 242 and second combination function 250. The control parts of the second control unit 230 may differ from that of masking control unit 131. For example, a different ancillary block cipher unit 242 and different first and/or second combination functions may be used. However, masking block cipher 241 is chosen the same as masking block cipher 141, so that if no fault occurs both masking control functions 131 and 230 produce the same value, e.g., the first block cipher result in masked form, $B_m(C_1)$. Again, due to different encodings used in masking control units 131 and 230 this may not be directly visible to an attacker.

If masking control unit 230 uses the same first combination function, ancillary block cipher as masking control unit 131 and encodings the stored control value ($\Delta_{store}$) may be shared between the masking control units 131 and 230.

Cryptographic device 200 further comprises a third masking control unit 330 arranged to take the result of the first masking control unit and the result of the second masking control unit as input, the third masking unit using the inverse of the masking block cipher of the first and second masking control unit. Note that both in cryptographic device 200 and in cryptographic device 102 the control unit 131 is followed by the inverse of the masking block cipher.

The masking control unit 330 comprises a second combination function 340, masking block cipher unit 341, ancillary block cipher unit 342 and second combination function 350. The masking block cipher unit 341 uses the inverse of the masking block ciphers 141 and 241 of the masking control units 131 and 230.

If no fault occurs in any one of block cipher units 121-124 the control units 131 and 230 both produce the same block cipher result in masked form. In that case the masking control unit 330 will undo the masking through the inverse of the masking block cipher result, and produce the block cipher result.

If any one of the block cipher units 121-124 produces an incorrect block cipher result through a fault, the corresponding control unit 131 or 230 will produce an incorrect masked block cipher result. The incorrect masked block cipher result will in turn cause the masking control unit 330 to produce an incorrect result.

The masking control units 230 and 330 may be implemented as indicated above for masking control unit 131. For example, the first and second combination functions may be an xor, variables may be jointly encoded, rounds need not be aligned, etc.

Suppose the attacker wants to modify a variable, say a nibble, of the last round input of the target block cipher in one of the block cipher units 121-124. He wants to draw conclusions on the key based on the observed changes in the cipher text output received at the output of masking control unit 330. For example, at this point the output may be unencoded, e.g., if the target block cipher is a decryption, say, of content intended for rendering. For the changes made by the attacker to be meaningful, he must 'hit' all four block cipher units 121-124 in the same way, so that they all turn to the same C'. If he fails to do so, the output is not meaningful to the attacker, e.g., through the masking block ciphers.

Suppose that variables in the two block cipher units 121 and 122 are jointly encoded and that the block cipher rounds are unaligned, e.g., as in FIG. 5a. The following reasoning applies to any attacker using DFA on any round, but for the sake of presentation consider an attacker who chooses to inject faults at the beginning of round 16 of the target block cipher. There are 26 rounds in FIG. 5a and to hit both target block ciphers at the start of their respective 16-th rounds, he has to inject faults at the start of rounds 22 and 24. The fault injected in round 24 must hit only the lower branch and miss the upper branch, the fault injected in round 22 must only hit the upper branch and miss the lower branch. So if the faults are injected on encoded nibble pairs, there are 2552 possibilities, of which only 15 give the same C'.

For block cipher units 123 and 124 a similar reasoning apples, the attacker again has to apply a change in two rounds which hits the nibbles in precisely the same way as in unit 121 and 122: there is only one out of the 2552 possibilities that does that. So the amount of work needed to find all meaningful changes is 2554. Here we assume that the attacker already knows which encoded nibbles he has to change in which rounds: finding that out is also a lot of work, though it needs to be done only once.

In the above workload estimate we only considered the workload of the differential fault analysis. Conceivably, an attacker may attempt to attack the system by finding all valid representatives per nibble of (C, C) or of (C, 0) pairs. Making use of this information, the workload of the DFA attack would reduce from $255^4$ to $15^4$. However, if the joint encoding uses multiple shares, for instance, 16 shares, to encode the values, finding a complete set of valid representatives becomes infeasible.

FIG. 4a schematically shows an example of an embodiment of a cryptographic device 400.

Cryptographic device 400 comprises block cipher units 121-128 the outputs of which are combined in pairs by first control units 431-434. The results of the first control units 431-434 are further combined by second control units 435-437 until only one result remains.

For example, control units 435 and 436 could use no masking block cipher, and masking control unit 437 could use the inverse of the masking block ciphers of units 431-434. Alternatively, control units 435 and 436 could use a further masking block cipher, and masking control unit 437 could use the inverse of the further masking block cipher followed by the inverse of the masking block cipher of the masking control unit 431-434.

As the number of block cipher units and control unit increases the workload of the attacker increases quickly.

FIG. 4b schematically shows an example of an embodiment of a cryptographic device 400 in which the number of block cipher units is not a power of two, and more in particular is odd.

Block cipher units 121-123 are combined by control units 431 and 432. One of the block cipher results is used as an input to two different control units. In an embodiment, the cryptographic device comprises two different control units that receive one of the two inputs from the same block cipher unit. The control units FIG. 4b may be configured, e.g., as in FIG. 3.

Typically, the cryptographic devices shown herein each comprise a microprocessor (not separately shown) which executes appropriate software stored at the device; for example, that software may have been downloaded and/or stored in a corresponding memory, e.g., a volatile memory such as RAM or a non-volatile memory such as Flash (not separately shown). Alternatively, the devices may, in whole or in part, be implemented in programmable logic, e.g., as field-programmable gate array (FPGA). The devices may be implemented, in whole or in part, as a so-called application-specific integrated circuit (ASIC), i.e., an integrated circuit (IC) customized for their particular use. For example, the circuits may be implemented in CMOS, e.g., using a hardware description language such as Verilog, VHDL etc.

In an embodiment, a cryptographic device comprises a first block cipher circuit, a second block cipher circuit and a first control circuit. The device may comprise additional circuits, e.g., a first and/or second comparison circuit, an ancillary block cipher circuit, a masking block cipher circuit; these circuits may be comprised in the first control circuit. The device may comprise a further block cipher circuit, etc. The circuits implement the corresponding units described herein. The circuits may be a processor circuit and storage circuit, the processor circuit executing instructions represented electronically in the storage circuits. The circuits may also be FPGA, ASIC or the like.

Figure 6:
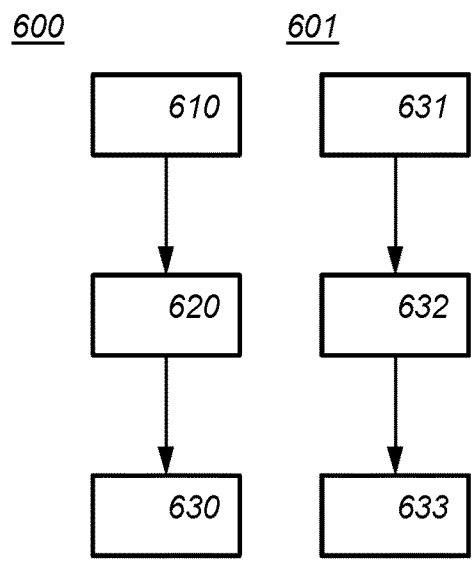

FIG. 6 show schematic flow charts that illustrate a cryptographic method 600 to compute a target block cipher $B_t$ on an input message 110. Method 600 comprises computing 610 the target block cipher $B_t$ on the input message obtaining a first block cipher result $C_1$, computing 620 the target block cipher $B_t$ on the input message obtaining a second block cipher result $C_2$, and using 630 the first block cipher result and the second block cipher result as input in a first control act.

The control act is illustrated by flowchart 601. The control act takes as input a first value and a second value and produces the first value only if the first value and the second value are equal. Control act 601 comprises combining 631 the first value and the second value by applying a first combination function 140 to the first value and the second value obtaining a comparison value, said combination function being equal to a predetermined value, e.g., 0 or δ, only if the first value and second value are equal, and computing 632 an ancillary block cipher 142, $B_1$ on the comparison value, obtaining a computed control value $\Delta_{comp}$, and combining 633 the first value, the computed control value $\Delta_{comp}$, and a stored control value $\Delta_{store}$ by applying a second combination function, said second combination function producing the first value only if the computed control value $\Delta_{comp}$ equals the stored control value $\Delta_{store}$.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps 610 and 620 may be executed, at least partially, in parallel. Moreover, a given step may not have finished completely before a next step is started.

A method according to the invention may be executed using software, which comprises instructions for causing a processor system to perform method 600. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bit stream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the means of at least one of the systems and/or products set forth.

Figure 7A:
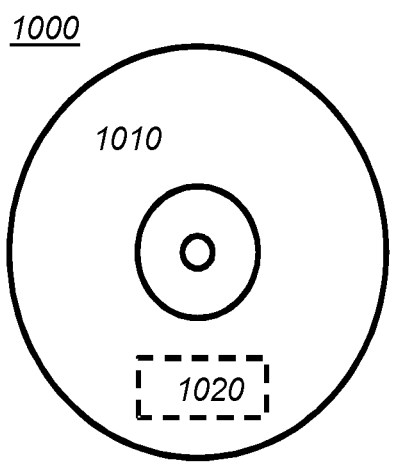

FIG. 7a shows a computer readable medium 1000 having a writable part 1010 comprising a computer program 1020, the computer program 1020 comprising instructions for causing a processor system to perform a cryptographic method, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said cryptographic method.

Figure 7B:
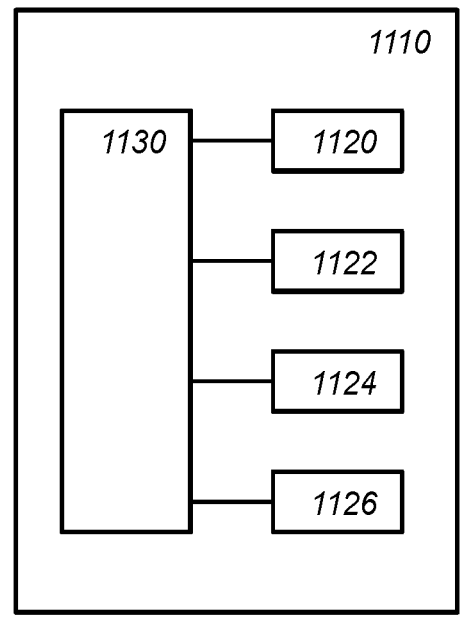

FIG. 7b shows in a schematic representation of a processor system 1140 according to an embodiment. The processor system comprises one or more integrated circuits 1110. The architecture of the one or more integrated circuits 1110 is schematically shown in FIG. 7b. Circuit 1110 comprises a processing unit 1120, e.g., a CPU, for running computer program components to execute a method according to an embodiment and/or implement its modules or units. Circuit 1110 comprises a memory 1121 for storing programming code, data, etc. Part of memory 1121 may be read-only. Circuit 1110 may comprise a communication element 1150, e.g., an antenna, connectors or both, and the like. Circuit 1110 may comprise a dedicated integrated circuit 1122 for performing part or all of the processing defined in the method. Processor 1120, memory 1121, dedicated IC 1122 and communication element 1150 may be connected to each other via an interconnect 1130, say a bus. The processor system 1110 may be arranged for contact and/or contact-less communication, using an antenna and/or connectors, respectively.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of embodiments or to formulas of embodiments, thus increasing the intelligibility of the claim. These references shall not be construed as limiting the claim.

LIST OF REFERENCE SIGNS 100, 101, 102 a cryptographic device
110 an input message
121-128 block cipher units
121 a first block cipher unit
122 a second block cipher unit
123 a third block cipher unit
124 a fourth block cipher unit
130 a first control unit
131 a first masking control unit
135 a further block cipher unit
140, 240, 340 a first combination function
141, 241, 341 a masking block cipher
142, 242, 342 an ancillary block cipher
150, 250, 350 a second combination function
160 a storage unit
200 a cryptographic device
230 a second masking control unit
330 a third control unit
330 a third masking control unit
400 a cryptographic device
431-434 a first control unit
435-437 a second control unit
$C_i$ a block cipher result
$\Delta_{store}$ a stored control value
$\Delta_{comp}$ a computed control value
$B_t$ a target block cipher
$B_m$ a masking block cipher
$B_1$ an ancillary block cipher

The invention claimed is:

1. A cryptographic device configured to encrypt an input message using a target block cipher ($B_t$), the device comprising:
a memory circuit, wherein the memory circuit is configured to store a stored control value ($\Delta_{store}$); and
a processor circuit coupled to the memory circuit,
wherein the processor circuit comprises circuits configured to execute computer instructions stored in the memory circuit,
wherein the circuits comprise:
a first circuit, wherein the first circuit is configured to compute the target block cipher ($B_t$) on the input message to obtain a first block cipher result ($C_1$);
a second circuit, wherein the second circuit is configured to compute the target block cipher ($B_t$) on the input message to obtain a second block cipher result ($C_2$); and
a control circuit, wherein the control circuit is configured to receive the first block cipher result as a first value and the second block cipher result as a second value,
wherein the control circuit produces the first value only when the first value and the second value are equal,
wherein the control circuit is configured to:
combine the first value and the second value by applying a first combination function to the first value and the second value to obtain a comparison value ($C_1-C_2$; $C_1 \oplus C_2$; comb ($C_1,C_2$)), wherein the combination function is equal to a predetermined value (0; $\delta$) only when the first value and second value are equal, and
compute an ancillary block cipher ($B_1$) on the comparison value to obtain a computed control value ($\Delta_{comp}$),
combine the first value, the computed control value ($\Delta_{comp}$), and the stored control value ($\Delta_{store}$) by applying a second combination function, and
output the first value from the second combination function only when the computed control value ($\Delta_{comp}$) equals the stored control value ($\Delta_{store}$).

2. The cryptographic device as in claim 1,
wherein the control circuit is a first masking control circuit, wherein the first masking control circuit is arranged to compute a masking block cipher ($B_m$) on the first value thus obtaining the first value in masked form,
wherein the second combination function is applied to the first value in the masked form,
wherein the first masking control circuit produces the first value in the masked form only when the first value and the second value are equal.

3. The cryptographic device as in claim 2, further comprising an output circuit configured to compute the inverse of the masking block cipher ($B_m^{-1}$) on the result of the control circuit.

4. The cryptographic device as in claim 2, further comprising:
a third circuit, wherein the third circuit is configured to compute the target block cipher ($B_t$) on the input message to obtain a third value ($C_3$);
a fourth circuit, wherein the fourth circuit is configured to compute the target block cipher ($B_t$) on the input message to obtain a fourth value ($C_4$);
a second masking control circuit, wherein the second masking control circuit is configured to take the third value and the fourth value as input, wherein the second masking control circuit uses the same masking block cipher as the first masking control circuit; and
a third masking control circuit, wherein the third masking control circuit is configured to take the result of the first masking control circuit and the result of the second masking control circuit as input, wherein the third masking circuit uses the inverse of the masking block cipher of the first masking control circuit and the second masking control circuit.

5. The cryptographic device as in claim 1, wherein the masking block cipher ($B_m$) is the same block cipher as the ancillary block cipher ($B_1$).

6. The cryptographic device as in claim 1,
wherein the target block ciphers ($B_t$) in the first circuit and the second circuit each comprises a sequence of multiple block cipher rounds and one or more dummy rounds interspersed among the block cipher rounds,
wherein a last block cipher round in the sequence of the first circuit is not aligned with a last block cipher round in the sequence of the second circuit.

7. The cryptographic device as in claim 6, wherein the sequence of rounds in the target block cipher ($B_t$) in the first or second block input circuit comprises a dummy round and the inverse of said dummy round.

8. The cryptographic device as in claim 6, wherein a first variable of a round in the sequence of the target block cipher ($B_t$) in the first circuit is jointly encoded with a corresponding second variable in the same round in the sequence of the target block cipher ($B_t$) in the second circuit.

9. The cryptographic device as in claim 8, wherein the joint encoding of the first and second variables is distributed over multiple shares.

10. The cryptographic device as in claim 1, further comprising:
a plurality of circuits each configured to:
compute the target block cipher ($B_t$) on the input message obtaining a block cipher result ($C_i$);
a plurality of first control circuits, wherein the plurality of first control circuit are arranged to take as input two block cipher results of the block cipher results ($C_i$) of the plurality of circuits; and
a plurality of second control circuits, wherein the plurality of second control circuits are arranged to combine the results of the plurality of first control circuits to produce a final block cipher result, wherein the final block cipher result is equal to the block cipher result of a first circuit of the plurality of circuits only when all block cipher results ($C_i$) of the plurality of circuits are equal.

11. The cryptographic device as in claim 1,
wherein the first combination function is the exclusive-or (XOR) of the first value and the second value, or
wherein at least part of the first combination function is formed by the arithmetic difference between at least part of the first value and at least part of the second value, or wherein at least part of the first combination function is formed by applying a look-up table to at least part of the first value and at least part of the second value, the look-up table giving the predetermined value if the at least part of the first value and at least part of the second value are equal.

12. The cryptographic device as in claim 1,
wherein the second combination function is the exclusive-or (XOR) of the first value or masked first value, the computed control value ($\Delta_{comp}$), and a stored control value ($\Delta_{store}$),
wherein at least part of the second combination function is formed by the sum of at least part of the first value or masked first value, at least part of the computed control value ($\Delta_{comp}$), minus at least part of the stored control value ($\Delta_{store}$),
wherein at least part of the second combination function is formed by the sum of at least part of the first value or masked first value, at least part of the stored control value (($\Delta_{store}$) minus at least part of the computed control value ($\Delta_{comp}$),
wherein at least part of the second combination function is formed by applying a look-up table to at least part of the first value or masked first value, at least part of the computed control value ($\Delta_{comp}$), and at least part of the stored control value ($\Delta_{store}$),
wherein the look-up table provides the at least part of the first value or masked first value if the at least part of the computed control value ($\Delta_{comp}$) and at least part of the stored control value ($\Delta_{store}$) are equal.

13. The cryptographic device as in claim 1, wherein the first circuit, the second circuit, and the control circuit are implemented as one or more table-networks.

14. A cryptographic method to encrypt an input message using a target block cipher ($B_t$) comprising:
storing a stored control value ($\Delta_{store}$);
computing the target block cipher ($B_t$) on the input message to obtain a first block cipher result ($C_1$);
computing the target block cipher ($B_t$) on the input message to obtain a second block cipher result ($C_2$); and
performing a first control act using the first block cipher result and the second block cipher result as first value and second value,
wherein the first control act produces the first value only when the first value and the second value are equal,
wherein the first control act comprises:
combining the first value and the second value by applying a first combination function to the first value and the second value to obtain a comparison value ($C_1-C_2$; $C_1 \oplus C_2$; comb($C_1,C_2$)), wherein said combination function is equal to a predetermined value (0; $\delta$) only when the first value and second value are equal;
computing an ancillary block cipher ($B_t$) on the comparison value to obtain a computed control value ($\Delta_{comp}$);
combining the first value, the computed control value ($\Delta_{comp}$), and the stored control value ($\Delta_{store}$) by applying a second combination function; and
outputting the first value as a result of the applying the second combination function only when the computed control value ($\Delta_{comp}$) equals the stored control value ($\Delta_{store}$).

15. The cryptographic method as in claim 14, further comprising:
computing a masking block cipher ($B_m$) on the first value thus obtaining the first value in masked form;
applying second combination function to the first value in the masked form; and
producing the first value in the masked form only when the first value and the second value are equal.

16. The cryptographic device as in claim 15, further comprising computing the inverse of the masking block cipher ($B_m^{-1}$) on the result of the control circuit.

17. The cryptographic method as in claim 15, further comprising:
computing the target block cipher ($B_t$) on the input message to obtain a third value ($C_3$);
computing the target block cipher ($B_t$) on the input message to obtain a fourth value ($C_4$);
second masking the third value and the fourth value as input, wherein the second masking uses the masking block cipher (Bm); and
third masking the result of the masking of the first value and the result of the second masking control masking of the third value and the fourth value, wherein the third masking uses the inverse of the masking block cipher (Bm).

18. The cryptographic method as in claim 14, wherein the masking block cipher ($B_m$) is the same block cipher as the ancillary block cipher ($B_1$).

19. The cryptographic method as in claim 14,
wherein the target block ciphers ($B_t$) in the first circuit and the second circuit each comprises a sequence of multiple block cipher rounds and one or more dummy rounds interspersed among the block cipher rounds,
wherein a last block cipher round in the sequence of the first circuit is not aligned with a last block cipher round in the sequence of the second circuit.

20. The cryptographic method as in claim 19, wherein the sequence of rounds in the target block cipher ($B_t$) in the first or second block input circuit comprises a dummy round and the inverse of said dummy round.

21. The cryptographic method as in claim 19, wherein a first variable of a round in the sequence of the target block cipher ($B_t$) in the first circuit is jointly encoded with a corresponding second variable in the same round in the sequence of the target block cipher ($B_t$) in the second circuit.

22. The cryptographic method as in claim 21, wherein the joint encoding of the first and second variables is distributed over multiple shares.

23. The cryptographic method as in claim 14, further comprising:
  computing the target block cipher ($B_t$) on the input message obtaining a block cipher result ($C_i$);
  computing a plurality of resulting using as input two block cipher results of the block cipher results ($C_i$); and
  combining the results of the plurality of first control circuits to produce a final block cipher result, wherein the final block cipher result is equal to the block cipher result of a first circuit of the plurality of circuits only when all block cipher results ($C_i$) of the plurality of circuits are equal.

24. The cryptographic method as in claim 14,
  wherein the first combination function is the exclusive-or (XOR) of the first value and the second value, or wherein at least part of the first combination function is formed by the arithmetic difference between at least part of the first value and at least part of the second value, or wherein at least part of the first combination function is formed by applying a look-up table to at least part of the first value and at least part of the second value, the look-up table giving the predetermined value if the at least part of the first value and at least part of the second value are equal.

25. The cryptographic method as in claim 14,
  wherein the second combination function is the exclusive-or (XOR) of the first value or masked first value, the computed control value ($\Delta_{comp}$), and a stored control value ($\Delta_{store}$),
  wherein at least part of the second combination function is formed by the sum of at least part of the first value or masked first value, at least part of the computed control value ($\Delta_{comp}$), minus at least part of the stored control value ($\Delta_{store}$),
  wherein at least part of the second combination function is formed by the sum of at least part of the first value or masked first value, at least part of the stored control value (($\Delta_{store}$) minus at least part of the computed control value ($\Delta_{comp}$),
  wherein at least part of the second combination function is formed by applying a look-up table to at least part of the first value or masked first value, at least part of the computed control value ($\Delta_{comp}$), and at least part of the stored control value ($\Delta_{store}$),
  wherein the look-up table provides the at least part of the first value or masked first value if the at least part of the computed control value ($\Delta_{comp}$) and at least part of the stored control value ($\Delta_{store}$) are equal.

26. A cryptographic device configured to decrypt an input message using a target block cipher ($B_t$), the device comprising:
  a memory circuit, wherein the memory circuit is configured to store a stored control value ($\Delta_{store}$); and
  a processor circuit coupled to the memory circuit,
    wherein the processor circuit comprises circuits configured to execute computer instructions stored in the memory circuit,
    wherein the circuits comprise:
      a first circuit, wherein the first circuit is configured to compute the target block cipher ($B_t$) on the input message to obtain a first block cipher result ($C_1$);
      a second circuit, wherein the second circuit is configured to compute the target block cipher ($B_t$) on the input message to obtain a second block cipher result ($C_2$); and
      a control circuit, wherein the control circuit is configured to receive the first block cipher result as a first value and the second block cipher result as a second value,
      wherein the control circuit produces the first value only when the first value and the second value are equal,
      wherein the control circuit is configured to:
        combine the first value and the second value by applying a first combination function to the first value and the second value to obtain a comparison value ($C_1-C_2$; $C_1 \oplus C_2$; comb($C_1,C_2$)) wherein the combination function is equal to a predetermined value (0; $\delta$) only when the first value and second value are equal, and
        compute an ancillary block cipher ($B_1$) on the comparison value to obtain a computed control value ($\Delta_{comp}$),
        combine the first value, the computed control value ($\Delta_{comp}$), and the stored control value ($\Delta_{store}$) by applying a second combination function, and
        output the first value from the second combination function only when the computed control value ($\Delta_{comp}$) equals the stored control value ($\Delta_{store}$).

27. The cryptographic device as in claim 26,
  wherein the control circuit is a first masking control circuit, wherein the first masking control circuit is arranged to compute a masking block cipher ($B_m$) on the first value thus obtaining the first value in masked form,
  wherein the second combination function is applied to the first value in the masked form,
  wherein the first masking control circuit produces the first value in the masked form only when the first value and the second value are equal.

28. The cryptographic device as in claim 27, further comprising an output circuit configured to compute the inverse of the masking block cipher ($B_m^{-1}$) on the result of the control circuit.

29. The cryptographic device as in claim 27, further comprising:
  a third circuit, wherein the third circuit is configured to compute the target block cipher ($B_t$) on the input message to obtain a third value ($C_3$);
  a fourth circuit, wherein the fourth circuit is configured to compute the target block cipher ($B_t$) on the input message to obtain a fourth value ($C_4$);
  a second masking control circuit, wherein the second masking control circuit is configured to take the third value and the fourth value as input, wherein the second masking control circuit uses the same masking block cipher as the first masking control circuit; and a third masking control circuit, wherein the third masking control circuit is configured to take the result of the first masking control circuit and the result of the second masking control circuit as input, wherein the third masking circuit uses the inverse of the masking block cipher of the first masking control circuit and the second masking control circuit.

30. The cryptographic device as in claim 26, wherein the masking block cipher ($B_m$) is the same block cipher as the ancillary block cipher ($B_1$).

31. The cryptographic device as in claim 26,
wherein the target block ciphers ($B_t$) in the first circuit and the second circuit each comprises a sequence of multiple block cipher rounds and one or more dummy rounds interspersed among the block cipher rounds,
wherein a last block cipher round in the sequence of the first circuit is not aligned with a last block cipher round in the sequence of the second circuit.

32. The cryptographic device as in claim 31, wherein the sequence of rounds in the target block cipher ($B_t$) in the first or second block input circuit comprises a dummy round and the inverse of said dummy round.

33. The cryptographic device as in claim 31, wherein a first variable of a round in the sequence of the target block cipher ($B_t$) in the first circuit is jointly encoded with a corresponding second variable in the same round in the sequence of the target block cipher ($B_t$) in the second circuit.

34. The cryptographic device as in claim 33, wherein the joint encoding of the first and second variables is distributed over multiple shares.

35. The cryptographic device as in claim 26, further comprising:
a plurality of circuits each configured to:
compute the target block cipher ($B_t$) on the input message obtaining a block cipher result ($C_i$);
a plurality of first control circuits, wherein the plurality of first control circuit are arranged to take as input two block cipher results of the block cipher results ($C_i$) of the plurality of circuits; and
a plurality of second control circuits, wherein the plurality of second control circuit are arranged to combine the results of the plurality of first control circuits to produce a final block cipher result, wherein the final block cipher result is equal to the block cipher result of a first circuit of the plurality of circuits only when all block cipher results ($C_i$) of the plurality of circuits are equal.

36. The cryptographic device as in claim 26,
wherein the first combination function is the exclusive-or (XOR) of the first value and the second value, or wherein at least part of the first combination function is formed by the arithmetic difference between at least part of the first value and at least part of the second value, or wherein at least part of the first combination function is formed by applying a look-up table to at least part of the first value and at least part of the second value, the look-up table giving the predetermined value if the at least part of the first value and at least part of the second value are equal.

37. The cryptographic device as in claim 26,
wherein the second combination function is the exclusive-or (XOR) of the first value or masked first value, the computed control value ($\Delta_{comp}$), and a stored control value ($\Delta_{store}$), wherein at least part of the second combination function is formed by the sum of at least part of the first value or masked first value, at least part of the computed control value ($\Delta_{comp}$), minus at least part of the stored control value ($\Delta_{store}$), wherein at least part of the second combination function is formed by the sum of at least part of the first value or masked first value, at least part of the stored control value (($\Delta_{store}$) minus at least part of the computed control value ($\Delta_{comp}$), wherein at least part of the second combination function is formed by applying a look-up table to at least part of the first value or masked first value, at least part of the computed control value ($\Delta_{comp}$), and at least part of the stored control value ($\Delta_{store}$), wherein the look-up table provides the at least part of the first value or masked first value if the at least part of the computed control value ($\Delta_{comp}$) and at least part of the stored control value ($\Delta_{store}$) are equal.

38. The cryptographic device as in claim 26, wherein the first circuit, the second circuit, and the control circuit are implemented as one or more table-networks.

39. A cryptographic method to decrypt an input message using a target block cipher ($B_t$) comprising:
storing a stored control value ($\Delta_{store}$);
computing the target block cipher ($B_t$) on the input message to obtain a first block cipher result ($C_1$);
computing the target block cipher ($B_t$) on the input message to obtain a second block cipher result ($C_2$); and
performing a first control act using the first block cipher result and the second block cipher result as first value and second value,
wherein the first control act produces the first value only when the first value and the second value are equal,
wherein the first control act comprises:
combining the first value and the second value by applying a first combination function to the first value and the second value to obtain a comparison value $(C_1 - C_2; C_1 \oplus C_2; \text{comb}(C_1, C_2))$, wherein said combination function is equal to a predetermined value (0; $\delta$) only when the first value and second value are equal;
computing an ancillary block cipher ($B_t$) on the comparison value to obtain a computed control value ($\Delta_{comp}$);
combining the first value, the computed control value ($\Delta_{comp}$), and the stored control value ($\Delta_{store}$) by applying a second combination function; and
outputting the first value as a result of the applying the second combination function only when the computed control value ($\Delta_{comp}$) equals the stored control value ($\Delta_{store}$).

40. The cryptographic method as in claim 39, further comprising:
computing a masking block cipher ($B_m$) on the first value thus obtaining the first value in masked form;
applying second combination function to the first value in the masked form; and
producing the first value in the masked form only when the first value and the second value are equal.

41. The cryptographic device as in claim 40, further comprising computing the inverse of the masking block cipher ($B_m^{-1}$) on the result of the control circuit.

42. The cryptographic method as in claim 40, further comprising:
  computing the target block cipher ($B_t$) on the input message to obtain a third value ($C_3$);
  computing the target block cipher ($B_t$) on the input message to obtain a fourth value ($C_4$);
  second masking the third value and the fourth value as input, wherein the second masking uses the masking block cipher (Bm); and
  third masking the result of the masking of the first value and the result of the second masking control masking of the third value and the fourth value, wherein the third masking uses the inverse of the masking block cipher (Bm).

43. The cryptographic method as in claim 39, wherein the masking block cipher ($B_m$) is the same block cipher as the ancillary block cipher ($B_1$).

44. The cryptographic method as in claim 39,
  wherein the target block ciphers ($B_t$) in the first circuit and the second circuit each comprises a sequence of multiple block cipher rounds and one or more dummy rounds interspersed among the block cipher rounds,
  wherein a last block cipher round in the sequence of the first circuit is not aligned with a last block cipher round in the sequence of the second circuit.

45. The cryptographic method as in claim 44, wherein the sequence of rounds in the target block cipher ($B_t$) in the first or second block input circuit comprises a dummy round and the inverse of said dummy round.

46. The cryptographic method as in claim 44, wherein a first variable of a round in the sequence of the target block cipher ($B_t$) in the first circuit is jointly encoded with a corresponding second variable in the same round in the sequence of the target block cipher ($B_t$) in the second circuit.

47. The cryptographic method as in claim 46, wherein the joint encoding of the first and second variables is distributed over multiple shares.

48. The cryptographic method as in claim 39, further comprising:
  computing the target block cipher ($B_t$) on the input message obtaining a block cipher result ($C_i$);
  computing a plurality of resulting using as input two block cipher results of the block cipher results ($C_i$); and
  combining the results of the plurality of first control circuits to produce a final block cipher result, wherein the final block cipher result is equal to the block cipher result of a first circuit of the plurality of circuits only when all block cipher results ($C_i$) of the plurality of circuits are equal.

49. The cryptographic method as in claim 39,
  wherein the first combination function is the exclusive-or (XOR) of the first value and the second value, or wherein at least part of the first combination function is formed by the arithmetic difference between at least part of the first value and at least part of the second value, or wherein at least part of the first combination function is formed by applying a look-up table to at least part of the first value and at least part of the second value, the look-up table giving the predetermined value if the at least part of the first value and at least part of the second value are equal.

50. The cryptographic method as in claim 39,
  wherein the second combination function is the exclusive-or (XOR) of the first value or masked first value, the computed control value ($\Delta_{comp}$), and a stored control value ($\Delta_{store}$),
  wherein at least part of the second combination function is formed by the sum of at least part of the first value or masked first value, at least part of the computed control value ($\Delta_{comp}$), minus at least part of the stored control value ($\Delta_{store}$),
  wherein at least part of the second combination function is formed by the sum of at least part of the first value or masked first value, at least part of the stored control value (($\Delta_{store}$) minus at least part of the computed control value ($\Delta_{comp}$),
  wherein at least part of the second combination function is formed by applying a look-up table to at least part of the first value or masked first value, at least part of the computed control value ($\Delta_{comp}$), and at least part of the stored control value ($\Delta_{store}$),
  wherein the look-up table provides the at least part of the first value or masked first value if the at least part of the computed control value ($\Delta_{comp}$) and at least part of the stored control value ($\Delta_{store}$) are equal.

* * * * *